(12) United States Patent
Kawai et al.

(10) Patent No.: US 8,041,591 B2
(45) Date of Patent: Oct. 18, 2011

(54) BUSINESS PROCESS OPERATION METHOD AND SYSTEM

(75) Inventors: Ryo Kawai, Yokohama (JP); Jun Yoshida, Yokohama (JP); Mitsunobu Tasaka, Kawasaki (JP); Atsushi Hatakeyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1152 days.

(21) Appl. No.: 11/821,357

(22) Filed: Jun. 22, 2007

(65) Prior Publication Data

US 2008/0103796 A1    May 1, 2008

(30) Foreign Application Priority Data

Oct. 30, 2006   (JP) ................... 2006-294794

(51) Int. Cl.
*G06F 17/30* (2006.01)
(52) U.S. Cl. .................................... 705/7.11
(58) Field of Classification Search ............... 705/7, 7.11
See application file for complete search history.

(56) References Cited

U.S. PATENT DOCUMENTS

| 7,024,669 | B1 * | 4/2006 | Leymann et al. ............ 718/100 |
| 2004/0254945 | A1 * | 12/2004 | Schmidt et al. ............... 707/100 |
| 2005/0038911 | A1 * | 2/2005 | Watanabe et al. ............ 709/246 |
| 2006/0080641 | A1 * | 4/2006 | Taylor et al. .................. 717/126 |

OTHER PUBLICATIONS

Hollingsworth "The Workflow Management Coalition: The Workflow Reference Model", Jan. 1995, The Workflow Management Coalition Specification, pp. 1-68.*

* cited by examiner

*Primary Examiner* — Romain Jeanty
(74) *Attorney, Agent, or Firm* — Kilpatrick Townsend & Stockton LLP

(57) ABSTRACT

A format conversion decision definition generating unit 104 stores information whether or not a response message format from a service unit 134 may be utilized in all later service callings of a business process without format conversion in a repository 121 as format conversion decision information 127, by referring to business process definition information 105 and adapter definition information 106. Then, when a business process operation control unit 132 executes the business process, an adapter operation control unit 133 refers to the format conversion decision information 127 about a target service 134 at the time, and skips the format conversion when information indicating that the format conversion is unnecessary is stored in the format conversion decision information 127.

12 Claims, 14 Drawing Sheets

FIG.6

252 — Search response message/Standard message

Part A
<Requested product list Customer id=10>
  <Product id=100 name="ABC" num=3/>
</Requested product list>

Part B
<Inventory product list Shipping address=Domestic>
  <Inventory product id=100 rest=5 request=3/>
</Inventory product list>

255 — Search response message/Service message

Part A
<Requested product list Customer id=10>
  <Product id=100 name="ABC" num=3/>
</Requested product list>

Part B-α
<Inventory list>
  <Shipping address>Domestic</Shipping address>
  <Product id=100 request=3>
    <Remaining quantity>5</Remaining quantity>
  </Product>
</Inventory list>

253 — Inventory allocation message/Standard message

Part B
<Inventory product list Shipping address=Domestic>
  <Inventory product id=100 rest=5 request=3/>
</Inventory product list>

256 — Inventory allocation message/Service message

Part B-α
<Inventory list>
  <Shipping address>Domestic</Shipping address>
  <Product id=100 request=3>
    <Remaining quantity>5</Remaining quantity>
  </Product>
</Inventory list>

BUSINESS PROCESS OPERATION METHOD AND SYSTEM

INCORPORATION BY REFERENCE

This application relates to and claims priority from Japanese Patent Application No. 2006-294794 filed on Oct. 30, 2006, the entire disclosure of which is incorporated herein by reference.

BACKGROUND

The present invention relates to a business process operation method, a business process operation system, and programs, which execute a business process for achieving various kinds of services by a computer.

In recent years, the business environment is rapidly and substantially changing due to escalation of market competition in various fields, and progress of business merger and restructuring of business operations. As a result, an information system at a company has been renewed frequently. Therefore, the information system is required to be reconstructed easily in a short time.

For the requirements described above, a service oriented architecture is getting a lot of attention, in which existing services are reused to a maximum extent and a new service is developed as needed to develop another new service in a short time at low cost by combining the existing services and the new service.

In Japanese Patent Laid-open Publication No. 2001-16274 (equivalent of US2005/0038911A1), an example in which a format conversion of an adapter is skipped is disclosed. According to the example, even if a message format, which is transmitted and received between two services through the adapter, is different from a standard message format defined in the adapter, a format conversion to the standard message format of the adapters is skipped when the message format between the two services is identical. A response performance to a client can be improved by skipping the format conversion.

SUMMARY

However, in the Japanese Patent Laid-open Publication No. 2001-16274 (equivalent of US2005/0038911A1), the skip of the format conversion can be applied to only a message which is directly transmitted and received between two services because the invention does not consider so-called business process description language.

For example, a non-standard message is transmitted to a third service from a first service through a second service. When the transmitted message is not used at the second service and a message format transmitted from the first service and that received at the third service is identical, a format of the message transmitted from the first service is converted by the adapter when the message is transmitted to the second service. In addition, the format of the message is converted again when the message is transmitted to the third service from the second service. Because of the above reason, effects of the skip may be limited.

It is, therefore, one object of the present invention to provide a business process operation method, a business process operation system, and programs, which can improve a response performance to a client of a business process by increasing an occasion of a format conversion skip in a business process operation.

To solve the above problem, a computer which executes the business process refers to business process definition information of the business process and adapter definition information of an adapter, and decides whether or not a format of a response message, which is a response of a service of the business process, can be used without format conversion in all later service callings of the business process. Then, information based on the decision is stored in a storage as format conversion decision definition information. After that, the computer executes the business process and refers to the format conversion decision definition information of the service when the service is called, and if the format conversion decision definition information indicates that the format conversion is unnecessary, the format conversion in the adapter is skipped.

In the present invention, based on the decided result whether or not the format of the response message from the service can be utilized in all later service callings of the business process, a decision whether a format conversion skip at a service calling is available or not can be made. Therefore, occasions of the format conversion skip in the present invention are substantially increased compared with the conventional art, in which the decision whether the format conversion skip is available or not is made by only the next single service calling.

According to the present invention, the occasions of the format conversion skip in a business process operation can be substantially increased, thereby resulting in improvement of a response performance to a client of a business process.

BRIEF DESCRIPTION OF THE DRAWINGS

FIG. 6 is an illustration showing examples of search response messages and inventory allocation messages which are utilized in the order business process in FIG. 5;

DESCRIPTION OF THE EMBODIMENTS

Figure 1:
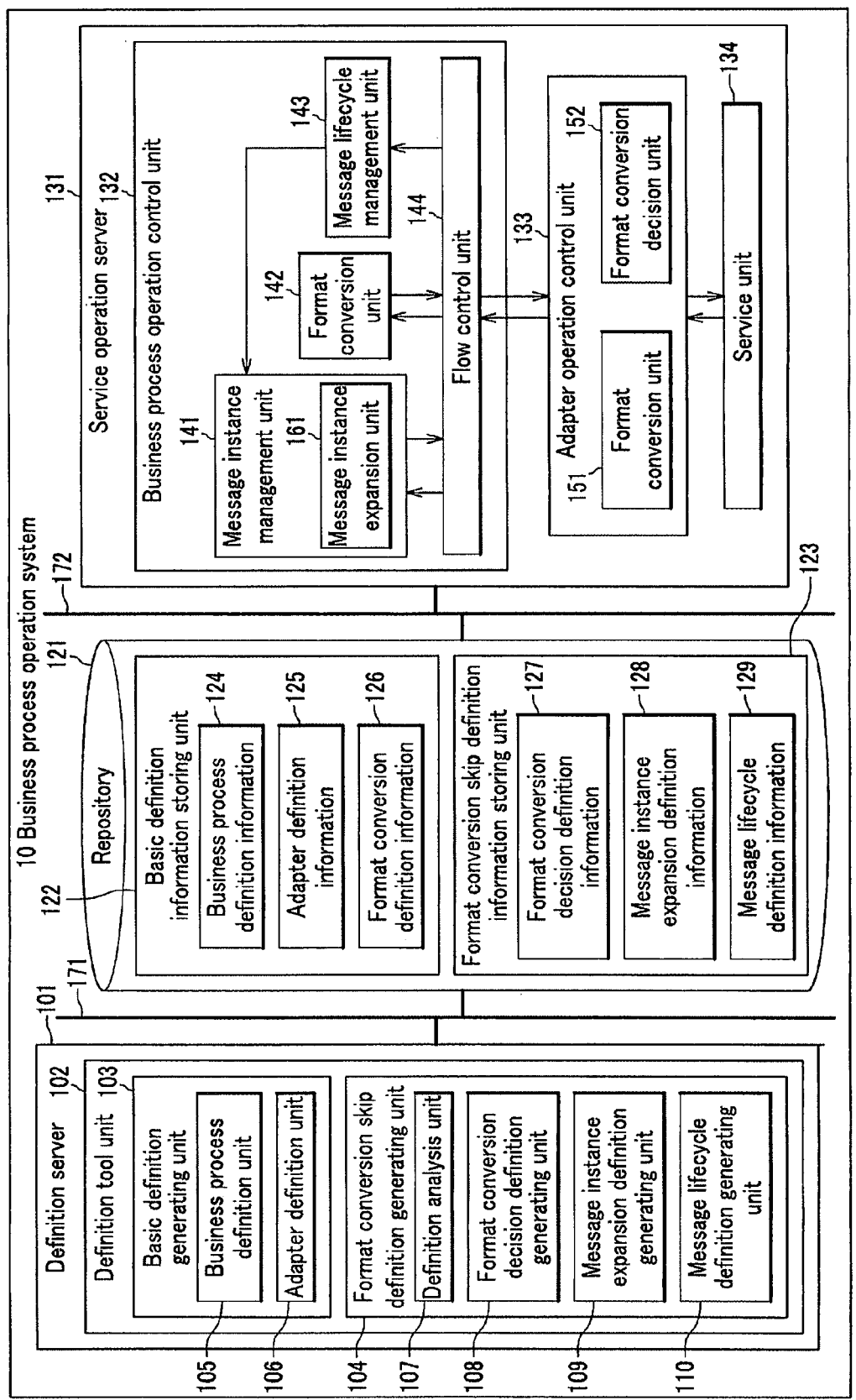
FIG. 1 is an illustration showing an example of a function block configuration of a whole business process operation system according to an embodiment of the present invention.

In the service oriented architecture, a service means a meaningful independent function in a task provided by an information system. The service includes, for example, a service name, a name of an operation to be provided by the service, and an interface definition which describes message formats at times of input and response of the operation. A language which describes the definition is called an interface description language.

Here, the operation means an implementation of a specific function constituting the service, and one service includes one or more operations. Also, the message format includes one or more sub-formats. For example, an inventory management service for managing an inventory of products includes a search operation for searching an inventory quantity of the products and an allocation operation for allocating the products. In addition, a message format at a time of response of the search operation includes sub-formats which indicate a searched product and an inventory of the product. Further, an actual message which is generated according to a message format is called a message instance. A client calls a service by transmitting the message instance to the service.

In addition, a new service which is formed by combining a plurality of services is called a business process. The new service defines a processing for controlling a flow of, for example, a branch processing and a format edition processing, as well as a service calling. Here, a language for describing a definition of the business process is called a business process description language.

In the business process description language, components which constitute a business process such as the service calling, branch processing, and format edition processing are called activities. In addition, a region storing a message instance which is used in each activity is called a variable, and a message format corresponding to the message instance is defined in the variable.

For example, in the service calling activity, an activity name, a name of a service to be called, an operation name, and a variable which stores message instances at times of input and response of the operation are defined. In addition, in the branch processing activity, for example, an activity name, a conditional equation which determines an activity of the branch, and a variable which is referred to by the conditional equation are defined. Further, in the format edition processing activity, for example, an activity name, names of variables to be edited and edited, and a format conversion definition from the variable to be edited to the edited variable are defined.

When a service is called from a business process, for example, when the service which is provided by a legacy system is called, the service can not be always called directly since a type or structure of a message format which is used in the service is different from that of the service calling activity.

In this case, the business process converts the message format by utilizing a function for controlling a service calling, and calls the service after the conversion. A conversion of the message format may also be achieved using the format edition processing activity of the business process. However, if the service is changed by some reason, the format edition processing activity of the business process also must be changed, thereby resulting in substantial effects.

Therefore, in a business process, a data structure and flow which would be proper standards are defined in advance. Then, a difference between message formats is cancelled by utilizing the function for controlling the service calling. It is noted that in the service oriented architecture, the function for controlling the service calling is called an adapter, and a server which operates the business process, adapter, and service is called a service operation server.

On the other hand, a format conversion generally needs much time, although it depends on a structure of a conversion target and a performance of an apparatus which executes the conversion. Therefore, for example, in a business process which calls a plurality of services provided by a legacy system, the format conversion is frequently required in the adapter in the business process operation due to a difference between a message format which is used in the service calling activity and that used in a service to be called. As a result, a response performance to a client is decreased. Here, message format which is used in the business process is called an standard message format and message format which is used in the service is called an service message format.

Hereinafter, embodiments of the present invention will be explained in detail by referring to figures.

<System Configuration>

FIG. 1 is an illustration showing an example of a whole function block configuration of a business process operation system according to an embodiment of the present invention. As shown in FIG. 1, the business process operation system 10 includes a definition server 101, a repository 121, and a service operation server 131. Here, the definition server 101 and the repository 121 are connected through a network 171, and the service operation server 131 and the repository 121 are connected through a network 172. In this case, the networks 171, 172 may be LAN (Local Area Network), or may be a global network such as WAN (Wide Area Network) and Internet.

In FIG. 1, the definition server 101 includes a definition tool unit 102, and generates, for example, definition information of a business process and an adapter and definition information of a format conversion skip, based on information which is input by a system administrator or user by using a function of the definition tool unit 102. Here, the definition tool unit 102 includes a basic definition generating unit 103 which generates basic definition information of a business process operation and a format conversion skip definition generating unit 104 which generates format conversion skip definition information of the format conversion skip. In addition, the basic definition generating unit 103 includes a business process definition unit 105 and an adapter definition unit 106. The format conversion skip definition generating unit 104 includes a definition analysis unit 107, a format conversion decision definition generating unit 108, a message instance expansion definition generating unit 109, and a message lifecycle definition generating unit 110.

The repository 121 is a storage server which stores various kinds of information which is generated by the definition server 101, and includes a basic definition information storing unit 122 and a format conversion skip definition information storing unit 123. Here, in the basic definition information storing unit 122, for example, business process definition information 124, adapter definition information 125, and format conversion definition information 126 are stored. In addition, in the format conversion skip definition information storing unit 123, for example, format conversion decision definition information 127, message instance expansion definition information 128, and message lifecycle definition information 129 are stored.

The service operation server 131 includes, for example, a business process operation control unit 132, an adapter operation control unit 133, and a service unit 134, and each unit executes a predetermined business process, an adapter function, and a service. Here, the business process operation control unit 132 includes, for example, a message instance management unit 141 which includes a message instance expansion unit 161, a format conversion unit 142, a message lifecycle management unit 143, and a flow control unit 144. In addition, the adapter operation control unit 133 includes, for example, a format conversion unit 151 and a format conversion decision unit 152.

Figure 2:
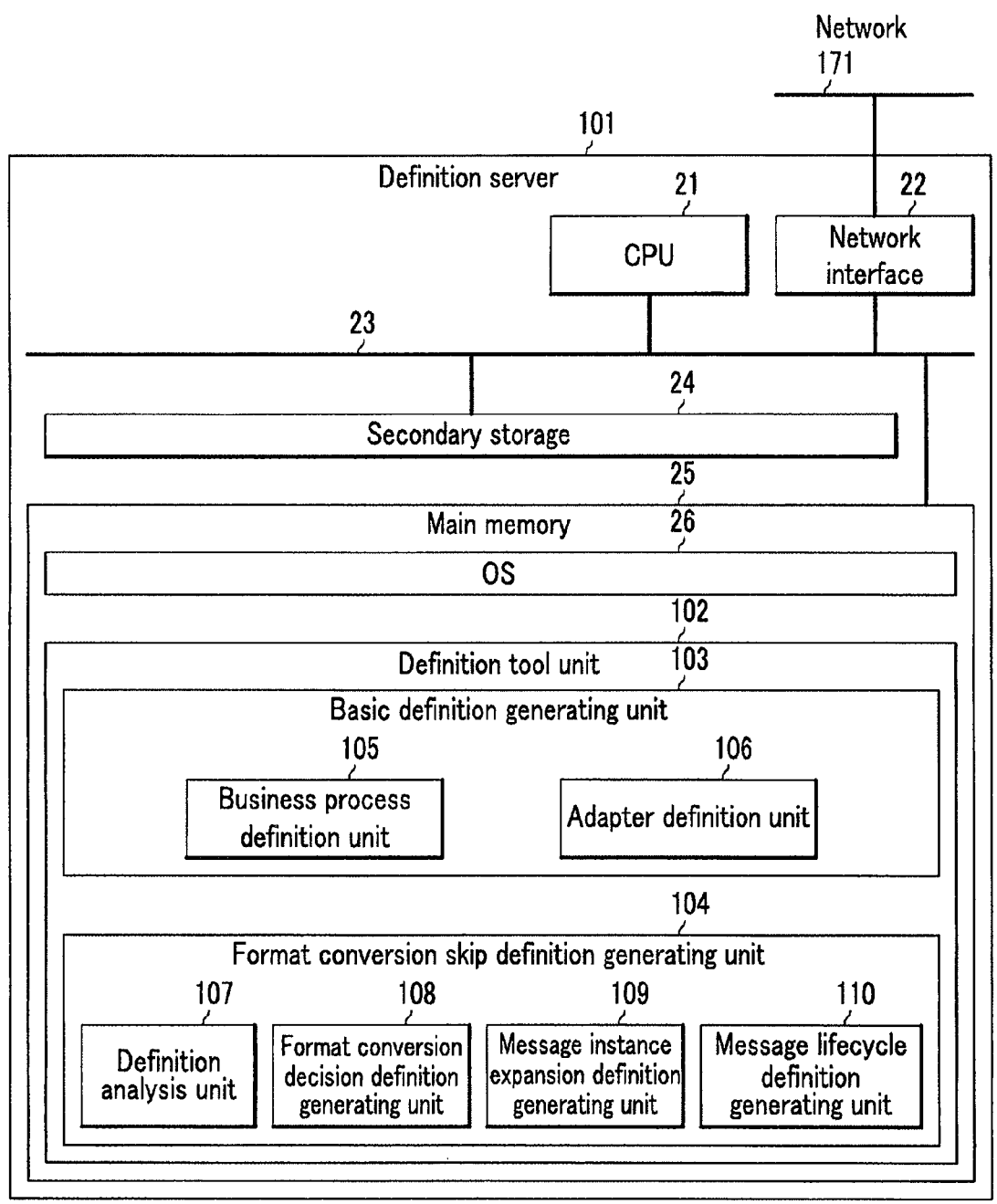
FIG. 2 is an illustration showing an example of a computer configuration of a definition server.

FIG. 2 is an illustration showing an example of a computer configuration of the definition server 101. As shown in FIG. 2, the definition server 101 includes, for example, a CPU 21, a network interface 22, a secondary storage 24 which is composed of, for example, a hard disc, a main memory 25 which is composed of, for example, a RAM (Random Access Memory), and a bus 23 which connects the components described above one another. Further, the definition server 101 is connected to the network 171 through the network interface 22.

Here, the CPU 21 executes programs stored in the main memory 25 to achieve a predetermined function of the definition server 101. In addition, in the main memory 25, programs for executing each function block of the definition tool unit 102 are stored, as well as OS (Operating System) 26.

As described above, the definition tool unit 102 includes the basic definition generating unit 103 which is composed of, for example, the business process definition unit 105 and the adapter definition unit 106, and the format conversion skip definition generating unit 104 which is composed of, for example, the definition analysis unit 107, the format conversion decision definition generating unit 108, the message instance expansion definition generating unit 109, and the message lifecycle definition generating unit 110. Each of the function blocks 102 to 110 of the definition server 101 is put into practice by executing a program, which is stored in the main memory 25 and achieves a function of each of the function blocks 102 to 110, by the CPU 21. In this case, an entity of the operation and processing of each of the function blocks 102 to 110 is the CPU 21. However, hereinafter, for simplification, explanations will be made, assuming that each of the function blocks 102 to 110 is the entity of the operation and processing.

In addition, as another embodiment, each of the function blocks 102 to 110 of the definition server 101 may be put into practice by hardware in which, for example, a logic circuit which achieves the function is integrated into a circuit. In this case, each of the function blocks 102 to 110 becomes the entity of each operation and processing.

Figure 3:
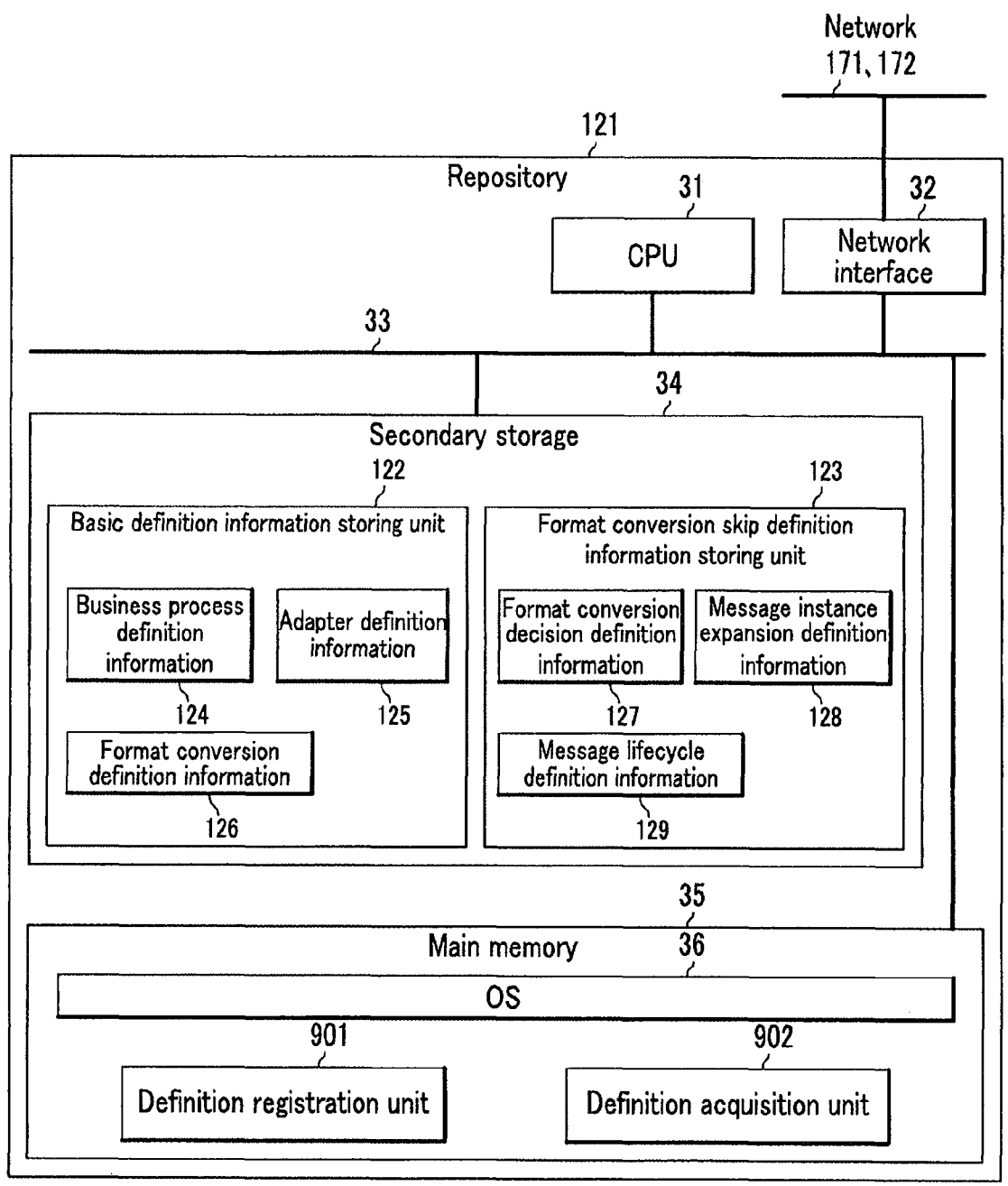
FIG. 3 is an illustration showing an example of a computer configuration of a repository.

FIG. 3 is an illustration showing an example of a computer configuration of the repository 121. As shown in FIG. 3, the repository 121 includes a CPU 31, a network interface 32, a secondary storage 34 which is composed of, for example, a hard disc, a main memory 35 which is composed of, for example, a RAM, and a bus 33 which connects the components described above one another. Further, the repository 121 is connected to the networks 171, 172 through the network interface 32.

Here, the CPU 31 executes programs stored in the main memory 35 to achieve a predetermined function of the repository 121. In addition, in the main memory 35, for example, programs for achieving functions of a definition registration unit 901 and a definition acquisition unit 902 are stored, as well as OS (Operating System) 36. Further, in the secondary storage 34, a basic definition information storing unit 122 and a format conversion skip definition information storing unit 123 are installed. The basic definition information storing unit 122 stores, for example, business process definition information 124, adapter definition information 125, and format conversion definition information 126. In addition, the format conversion skip definition information storing unit 123 stores, for example, format conversion decision definition information 127, message instance expansion definition information 128, and message lifecycle definition information 129.

A function block of, for example, the definition registration unit 901 and the definition acquisition unit 902 of the depository 121 is put into practice by executing a program, which is stored in the main memory and achieves a function of each of the function blocks 901, 902, by the CPU 31. In this case, an entity of the operation and processing of each of the function blocks 901, 902 is the CPU 31. However, hereinafter, for simplification, explanations will be made, assuming that each of the function blocks 901, 902 is the entity of the operation and processing.

In addition, as another embodiment, each of the function blocks 901, 902 of the repository 121 may be put into practice by hardware in which, for example, a logic circuit which achieves the function is integrated into a circuit. In this case, each of the function blocks 901, 902 becomes the entity of each operation and processing.

Figure 4:
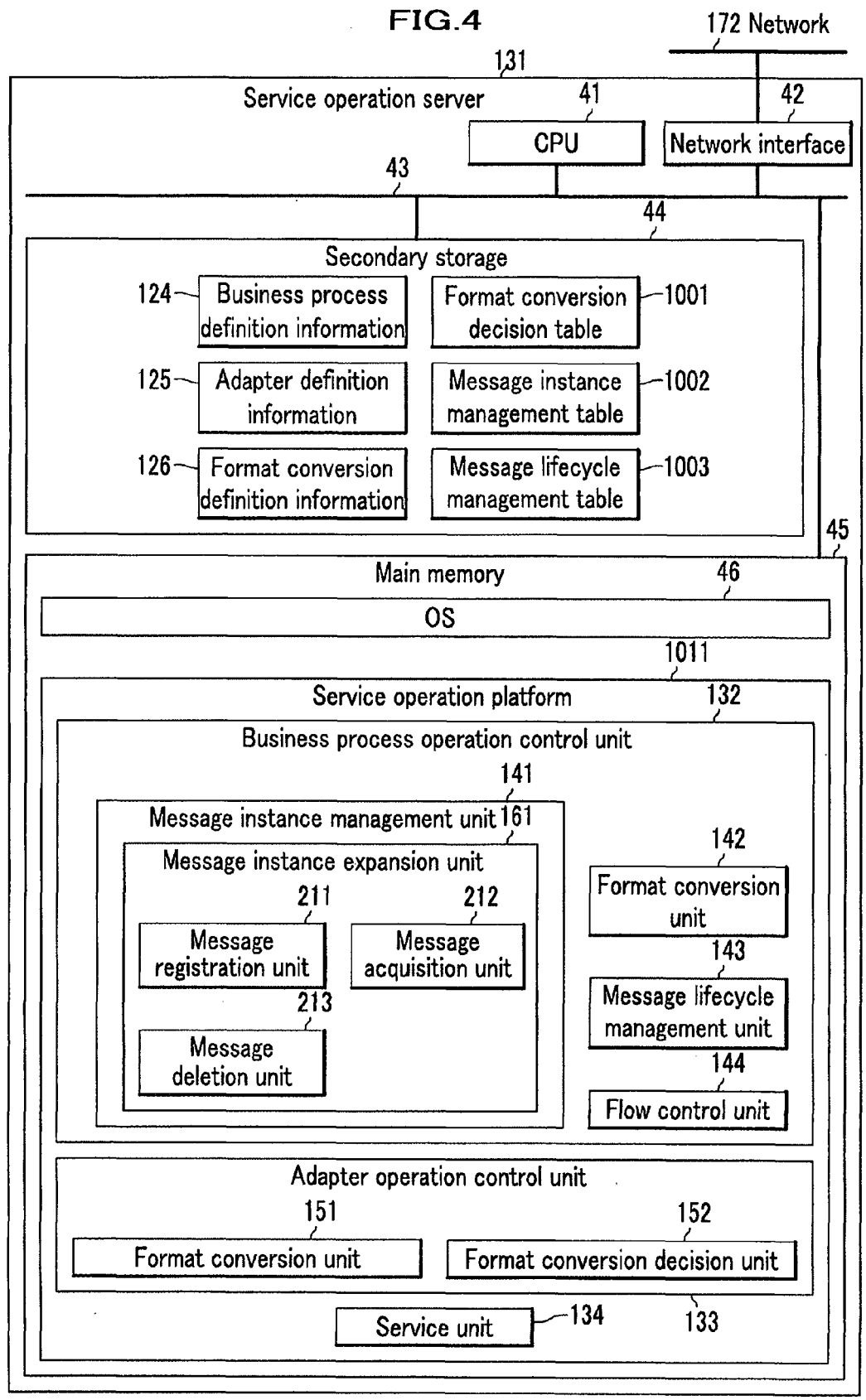
FIG. 4 is an illustration showing an example of a computer configuration of a service operation server.

FIG. 4 is an illustration showing an example of a computer configuration of the service operation server 131. As shown in FIG. 4, the service operation server 131 includes, for example, a CPU 41, a network interface 42, a secondary storage 44 which is composed of, for example, a hard disc, a main memory 45 which is composed of, for example, a RAM, and a bus 43 which connects the components described above one another. Further, the service operation server 131 is connected to the network 172 through the network interface 42.

Here, the CPU 41 executes programs stored in the main memory 45 to achieve a predetermined function of the service operation server 131. In addition, in the main memory 45, programs for achieving each function block included in a service operation platform 1011 are stored, as well as OS (Operating System) 46. It is noted that the service operation platform 1011 is a function block which includes a business process operation control unit 132, an adapter operation control unit 133, and a service unit 134.

In addition, the secondary storage 44 stores a format conversion decision table 1001 which manages whether there is a format conversion or not in the adapter operation control unit 133, a message instance management table 1002 for storing a message instance, and a message lifecycle management table 1003 for managing a message instance lifecycle. In addition to the above, for example, the business process definition information 124 which relates to a business process in operation, adapter definition information 125, and format conversion definition information 126 are stored in the secondary storage 44.

It is noted that the business process operation control unit 132 includes a flow control unit 144 which sequentially executes an activity according to a defined content by reading the business process definition information 124, a message instance management unit 141 which manages the message instance management table 1002, a format conversion unit 142 which converts a message format according to the format conversion definition information 126, and a message lifecycle management unit 143 which manages a lifecycle of a message according to the message lifecycle management table 1003. In addition, the message instance management unit 141 includes a message instance expansion unit 161, and the message instance expansion unit 161 includes a message registration unit 211 which executes a registration, acquisition and deletion of a message instance against the message instance management table 1002, a message acquisition unit 212, and a message deletion unit 213.

Further, the adapter operation control unit 133 includes a format conversion decision unit 152 which decides whether there is a format conversion or not by referring to the format conversion decision table 1001 and a format conversion unit 151 which converts a message format according to the format conversion definition information 126.

Each of function blocks 132 to 134, 141 to 144, 151, 152, 161, 211 to 213 of the service operation server 131 is put into practice by executing a program, which is stored in the main memory 45 and achieves each of the function blocks, by the CPU 41. In this case, an entity of the operation and processing of each of the function blocks 132 to 134, 141 to 144, 151, 152, 161, 211 to 213 is the CPU 41. However, hereinafter, for simplification, explanations will be made, assuming that each of the function blocks 132 to 134, 141 to 144, 151, 152, 161, 211 to 213 is the entity of the operation and processing.

In addition, as another embodiment, each of the function blocks 132 to 134, 141 to 144, 151, 152, 161, 211 to 213 of the definition server 101 may be executed by hardware in which, for example, a logic circuit which achieves a function of each of the function blocks is integrated into a circuit. In this case, each of the function blocks 132 to 134, 141 to 144, 151, 152, 161, 211 to 213 becomes the entity of each operation and processing.

It is noted that configurations of the business process operation system 10, the definition server 101, the repository 121, and the service operation server 131 are not limited to the examples explained by using FIG. 1 to FIG. 4. For example, the definition server 101, the repository 121, and the service operation server 131 may be in a same local area network, and may be in a different local area network separately. In addition, the repository 121 may be configured in the secondary storage 24 of a computer of the definition server 101, or may be configured in the secondary storage 44 of a computer of the definition operation server 131. Further, all of the definition server 101, the repository 121, and the service operation server 131 may be configured with a single computer.

In addition, in FIG. 2, functions of the definition server 101 are achieved by a single computer. However, the functions may be achieved by a plurality of computers which are connected to a network. Further, in FIG. 4, functions of the service operation server 131 are achieved by a single computer. However, the functions may also be achieved by a plurality of computers which are connected to one another in a network. In addition, functions of the definition server 101 and the service operation server 131 may be achieved by a single computer.

<Example of Business Process Operation>

Figure 5:
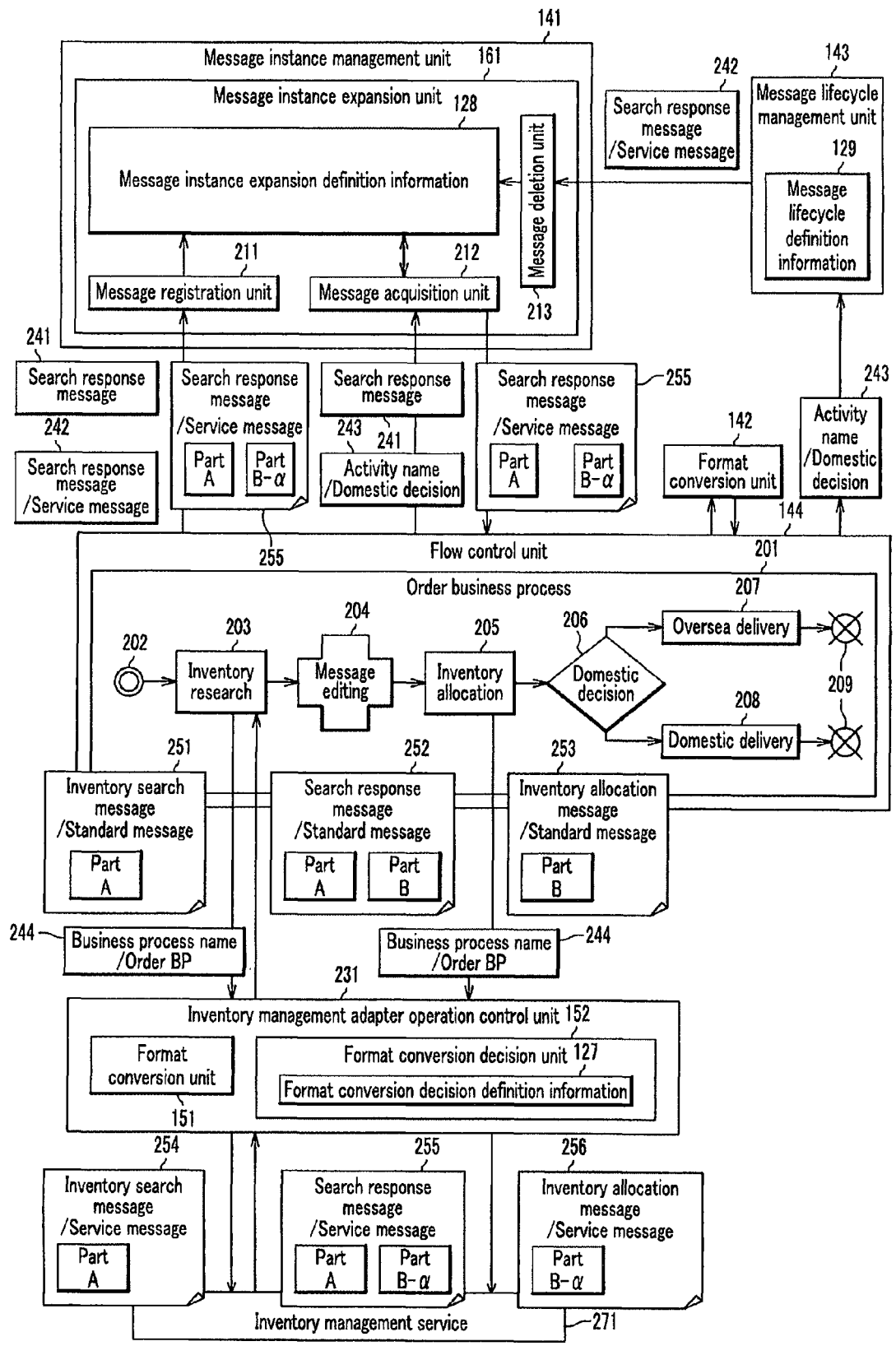
FIG. 5 is an illustration showing an example of a service operation server for operating an order business process.

Next, a performance example of the service operation server 131 will be explained using an order business process as an example, in which a processing of the order business process such as an order receipt of a product from a customer, an inventory search, a message format editing, an allocation of inventory, a delivery address decision, and an instruction of delivery is executed. FIG. 5 is an illustration showing examples of operations of the service operation server 131 which executes the order business process. FIG. 6 is an illustration showing examples of inventory search messages and inventory allocation messages which are utilized in the order business process in FIG. 5.

In FIG. 5, the order business process 201 includes a start activity 202, an inventory search activity 203, a message format editing activity 204, an inventory allocation activity 205, a domestic decision activity 206, an oversea delivery activity 207, a domestic delivery activity 208, and an end activity 209. Here, operations of the order business process 201 by the service operation server 131 will be explained briefly.

In FIG. 5, the flow control unit 144 of the service operation server 131 starts the operations of the order business process 201 with the start activity 202, and executes the inventory search activity 203. As a processing of the inventory search activity 203, the flow control unit 144 transmits an inventory search message (standard message) 251 to an inventory management service 271 through an inventory management adapter operation control unit 231. In this case, since an inventory search message (service message) 254 to be received by the inventory management service 271 is identical to the inventory search message (standard message) 251, the inventory management adapter operation control unit 231 does not execute a message format conversion.

Next, the inventory management service 271 executes a predetermined search operation, and transmits the search result as a search response message (service message) 255 to the order business process 201 through the inventory management adapter operation control unit 231. In this case, since a search response message (standard message) 252 to be received by the order business process 201 is different from the search response message (service message) 255 (see FIG. 6, part B of search response message (standard message) 252 is different from part B-α of search response message (service message) 255), the inventory management adapter operation control unit 231 executes the message format conversion in principle. However, in the embodiment, the message format conversion is skipped when a conversion skip condition, described later, is satisfied.

It is noted that in FIG. 6, each of the search response message (standard message) 252 and search response message (service message) 255 include a part of a product list composed of a search target and a part of an inventory product list. The search response message (standard message) 252 includes a part A and part B, and the search response message (service message) 255 includes the part A which is identical to that of the search response message (standard message) 252 and the part B-α which has a different format from that of the part B of the search response message (standard message) 252. In addition, an inventory allocation message (standard message) 253 and an inventory allocation message (service message) 256 include an inventory product list. The inventory allocation message (standard message) 253 includes the part B and the inventory allocation message (service message) 256 includes the part B-α.

An explanation will be continued by referring to FIG. 5 again. When the flow control unit 144 receives the search response message (standard message) 252, subsequently, the flow control unit 144 executes the message editing activity 204. The flow control unit 144 copies the part B of the search response message (standard message) 252 as a processing of the message editing activity 204, and newly generates the inventory allocation message (standard message) 253. At this time, the message editing activity 204 does not refer to a content of the part B, that is, the standard message format is unnecessary for operating the message editing activity 204.

Next, the flow control unit 144 executes the inventory allocation activity 205, and transmits the inventory allocation message (standard message) 253 to the inventory management service 271 through the inventory management adapter operation control unit 231. At this time, since the inventory allocation message (service message) 256 to be received by the inventory management service 271 is different from the inventory allocation message (standard message) 253 (see FIG. 6), the inventory management adapter operation control unit 231 executes the message format conversion in principle. However, in the embodiment, when the message format conversion between the search response message (standard message) 252 and the search response message (service message) 255 is skipped, the message format conversion here is also skipped.

Next, the inventory management service 271 executes a predetermined inventory allocation operation, and the flow control unit 144 executes the domestic decision activity 206. In the example in FIG. 5, a conditional equation which utilizes the part B of the search response message (standard message) 252 is set in the domestic decision activity 206, and the flow control unit 144 determines an activity to be executed next (oversea delivery activity 207, or domestic delivery activity 208) by referring to the content of the part B and deciding the conditional equation.

It is noted that in the operation example of the business process described above, when the flow control unit 144 executes the domestic decision activity 206, the flow control unit 144 has only the search response message (service message) 255 which is actually received in the inventory search activity 203. That is, the flow control unit 144 does not have the part B of the search response message (standard message) 252 which is necessary for executing the domestic decision activity 206. In this case, the flow control unit 144 executes a format conversion of the search response message (service message) 255 by the format conversion unit 142 to obtain the search response message (standard message) 252.

As described above, in the embodiment, when the part B-α of the search response message (service message) 255 at a time of response of the inventory management service 271 can be utilized as it is, as the inventory allocation message (service message) 256 at a time of input of the inventory management service 271 to be called by the later inventory allocation activity 205 of the order business process 201, and when the part B-α of the search response message (service message) 255 is not referred to regarding a content of the part B by an activity prior to the inventory allocation activity 205 of the order business process 201, the format conversion in the inventory management adapter operation control unit 231 can be skipped.

<Configuration for Format Conversion Skip>

Subsequently, a configuration of the business process operation system 10 which is able to skip the format conversion in the adapter operation control unit 133 will be further explained in detail using FIG. 1 again.

The definition server 101 includes the format conversion skip definition generating unit 104 for enabling a format conversion skip in the adapter operation control unit 133. The format conversion skip definition generating unit 104 analyses the business process definition information 124 and the adapter definition information 125, which are input and generated by a system administrator or a user, using the definition analysis unit 107, and determines whether or not a message which is relayed by the adapter operation control unit 133 satisfies predetermined conditions of the format conversion skip. In addition, the format conversion skip definition generating unit 104 generates the format conversion decision definition information 127 (see FIG. 9) based on a result of the decision using the format conversion decision definition generating unit 108, and stores the information 127 in the repository 121.

Here, the predetermined conditions for skipping the format conversion are as follows. A service message format at a time of response to a service to be called and a standard message format at a time of reception of a service calling activity, which receives the response, are different from each other. A whole part or a part of the service message format at the time of response may be utilized by a service to be called by an activity after the present activity. In addition, a whole part or a part of the standard message format corresponding to the service message format at the time of response is unnecessary in an activity prior to the activity which calls the service after the present activity.

By the preparation described above, the service operation server 131 can skip the format conversion in the adapter operation control unit 133 as needed according to the format conversion decision table 1001 (see FIG. 4) which is generated by reading the format conversion decision definition information 127 from the repository 121.

In addition to the configuration of the definition server 101 described above, the service operation server 131 includes the message instance management unit 141. The message instance management unit 141 registers a standard message instance which is generated according to a standard message format and a service message instance of which the format conversion is skipped in the message instance management table 1002. For enabling the registration, the definition server 101 includes the message instance expansion definition generating unit 109. The message instance expansion definition generating unit 109 generates the message instance expansion definition information 128 for expanding a variable based on the analysis result of the business process definition information 124 and the adapter definition information 125, and stores the information 128 in the repository 121. Then, the service operation server 131 reads out the message instance expansion definition information 128 from the repository 121, and expands the variable before executing a business process so that the standard message instance and the service message instance can be stored. In addition, the service operation server 131 manages the message instance management table 1002 (see FIG. 4) which stores the expanded variable, using the message instance management unit 141.

With the configuration described above, the service operation server 131 can execute a business process, while managing a message instance of which the format conversion is skipped in the adapter operation control unit 133.

It is noted that in the configuration of the service operation server 131 described above, since the message instance management unit 141 stores a service message instance, of which the format conversion is skipped in the adapter operation control unit 133, in the message instance management table 1002, an excess region for storing the message instance is required in the message instance management table 1002. Therefore, in the embodiment, for reducing the excess region, a message instance which is unnecessary for executing a later activity is deleted from the message instance management table 1002 after analyzing an operation flow of activities in a business process.

For this purpose, the definition server 101 includes the message lifecycle definition generating unit 110. The message lifecycle definition generating unit 110 generates the message lifecycle definition information 129 which indicates a business process where a message instance, which is managed by the message instance management unit 141, can be scrapped based on analysis results of the business process definition information 124 and adapter definition information 125, and stores the information 129 in the repository 121. Then, the service operation server 131 reads the message lifecycle definition information 129 from the repository 121, and deletes the message instance from the message lifecycle management unit 143 according to the generated message lifecycle management table 1003 (see FIG. 4).

With the configuration described above, the service operation server 131 do not need to manage a message instance which is unnecessary for executing a business process, thereby resulting in reduction of storage consumption.

<Processing Flow in Definition Server 101>

Figure 7:
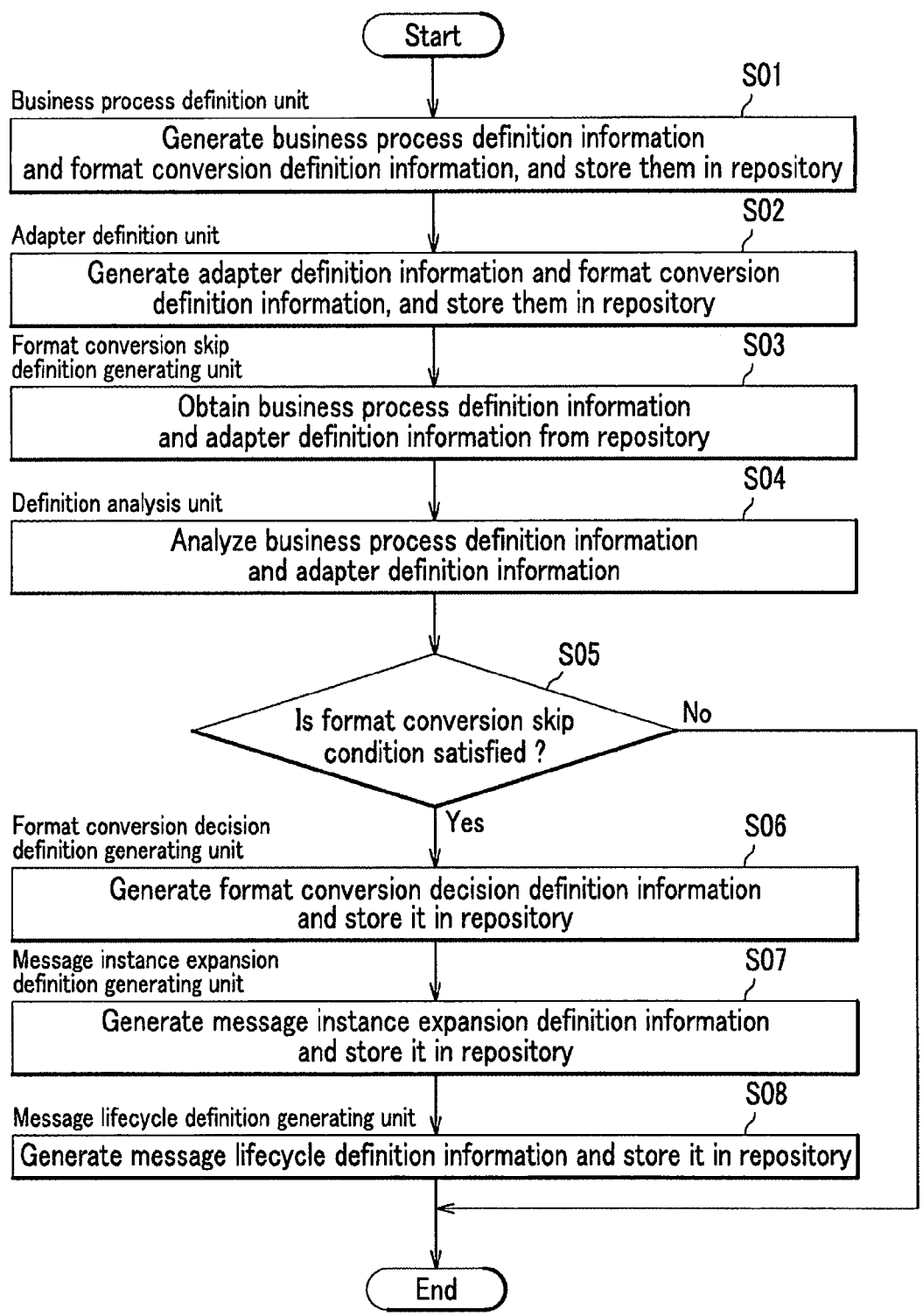
FIG. 7 is an illustration showing an example of a processing flow in a definition server.
Figure 8:
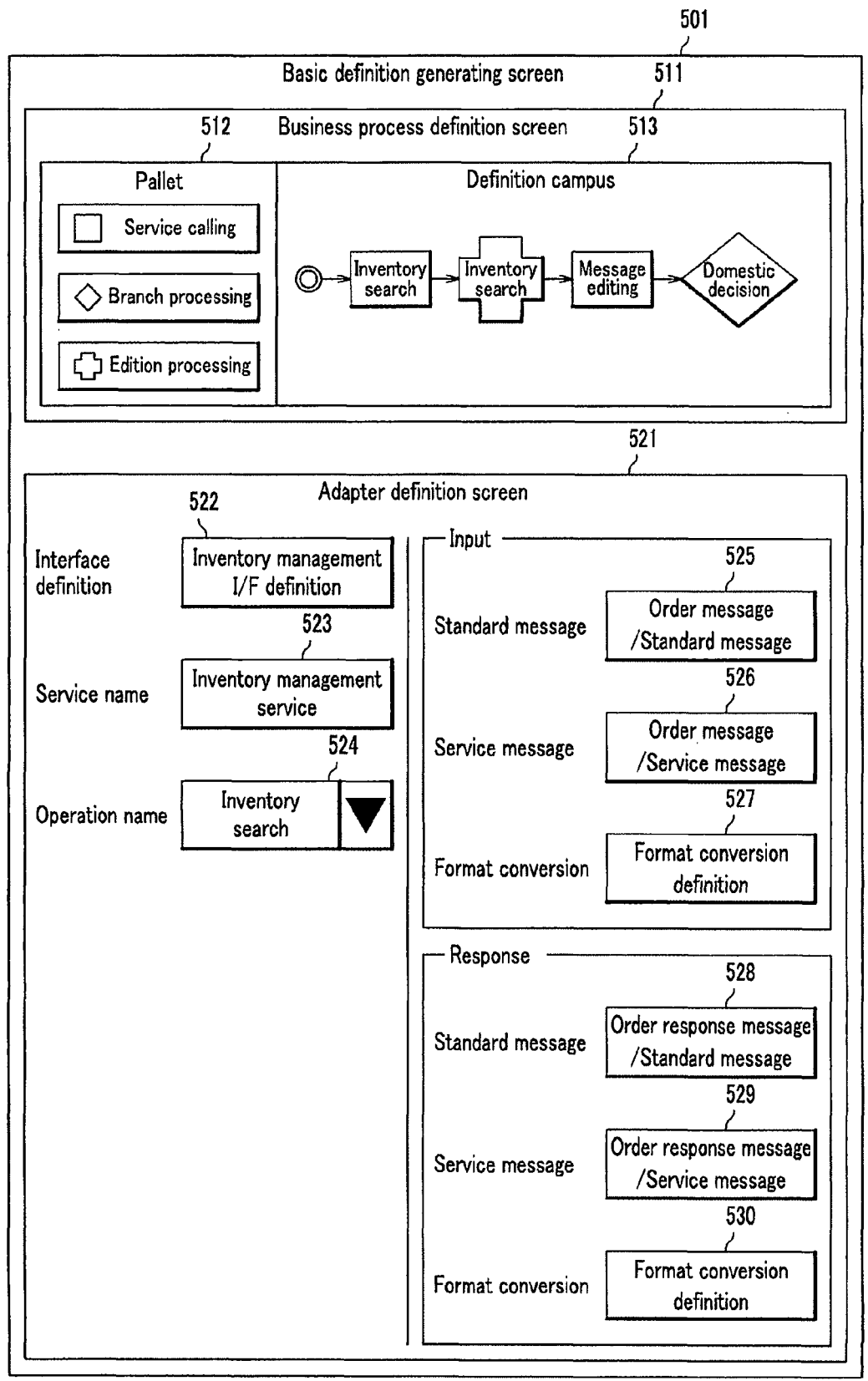
FIG. 8 is an illustration showing an example of a basic definition generating screen of a business process.

Next, a processing flow in the definition server 101 will be explained by referring to FIG. 7 and FIG. 8. Here, FIG. 7 is an illustration showing an example of the processing flow in the definition server 101. FIG. 8 is an illustration showing an example of a basic definition generating screen of a business process. It is noted that in FIG. 7, a name of a function block which is written at the upper left outside a processing block indicates the name of the function block to execute a content described in the function block (this is applied to FIG. 10 and later).

In FIG. 7, the business process definition unit 105 first displays a business process definition screen 511 of a basic definition generating screen 501 shown in FIG. 8 on a display of, for example, a terminal which is connected to the definition server 101, and generates the business process definition information 124 and format conversion definition information 126 based on information which is input by a system administrator or a user (business process designer) by utilizing the business process definition screen 511. Then, the business process definition unit 105 stores the business process definition information 124 and format conversion definition information 126 in the repository 121 (step S01).

At this time, a pallet 512 for selecting an activity which composes a business process and a definition campus 513 for arranging the selected activity according to a processing flow of the business process are displayed on the business process definition screen 511. Then, the business process designer selects an activity as needed from the pallet 512, and arranges the selected activity according to a predetermined business process processing order. In addition, the business process designer defines the business process by setting a name of the business process which uniquely identifies the business process, a name of the activity which uniquely identifies the activity, and information required to each activity.

Referring again to FIG. 7, the adapter definition unit 106 generates the adapter definition information 125 and format conversion definition information 126 based on information input by the business process designer by utilizing an adapter definition screen 521 which is displayed together with the business process definition screen 511 on the basic definition preparation screen 501, and stores the information 125 and the information 126 in the repository 121 (step S02).

At this time, the business process designer first inputs an interface definition name of a service in an interface definition input field 522 by utilizing the adapter definition screen 521 of the basic definition generating screen 501. Next, the adapter definition unit 106 reads interface definition information which is set in advance for the input interface definition name, and obtains a service name, an operation name, and service message formats of input and response of each operation. Then, the adapter definition unit 106 sets the obtained information in a service name input field 523, in an operation name input field 524, and in service message format input fields 526, 529, respectively.

In addition, the business process designer inputs standard message formats of transmission and reception, which are set in a service calling activity, in standard message format input fields 525, 528, and also inputs a format conversion definition between the standard message format and the service message format in format conversion definition input fields 527, 530. The adapter definition unit 106 generates the adapter definition information 125 and the format conversion definition information 126 based on these input and set information.

Next, the format conversion skip definition generating unit 104 obtains the business process definition information 124 and the adapter definition information 125 from the repository 121 (step S03) and transmits the information to the definition analysis unit 107. Then, the definition analysis unit 107 analyzes the business process definition information 124 and the adapter definition information 125 (step S04).

That is, in the step S04, the definition analysis unit 107 searches the adapter definition information 125 in which an interface of a service which is called by a service calling activity is set, by focusing attention on the service calling activity of the business process definition information 124, and outputs analysis results of the adapter definition information 125 and the business process definition information 124 which is necessary for generating the format conversion decision definition information 127, the message instance expansion definition information 128, and the message lifecycle definition information 129. Here, the analysis results may be temporarily stored in the main memory 25 of the definition server 101, or may be stored in the secondary storage 24 until a processing of step S08 is completed. In the embodiment, the analysis results are stored in the main memory 25.

Next, the definition analysis unit 107 decides whether or not conditions for format conversion skip in the adapter operation control unit 133 are satisfied based on the analysis results in the step S04 (step S05). When the conditions are satisfied (step S05: Yes), a processing of step S06 or later is executed. On the other hand, when the conditions are not satisfied (step S05: No), the processing in the definition server 101 ends.

Next, the format conversion skip definition generating unit 104 generates the format conversion decision definition information 127, which is definition information for skipping the format conversion in the adapter operation control unit 133, for each adapter based on the analysis results in the step S04, and stores the information 127 in the repository 121 (step S06). In addition, the message instance expansion definition generating unit 109 generates the message instance expansion definition information 128 which indicates information of a variable which expands a message instance based on the analysis results in the step S04, and stores the information 128 in the repository 121 (step S07). Further, the message lifecycle definition generating unit 110 generates the message lifecycle definition information 129 which indicates a process where a message instance, which is managed by the message instance management unit 141, is scrapped based on the analysis results in the step S04, and stores the information 129 in the repository 121 (step S08).

Figure 9:
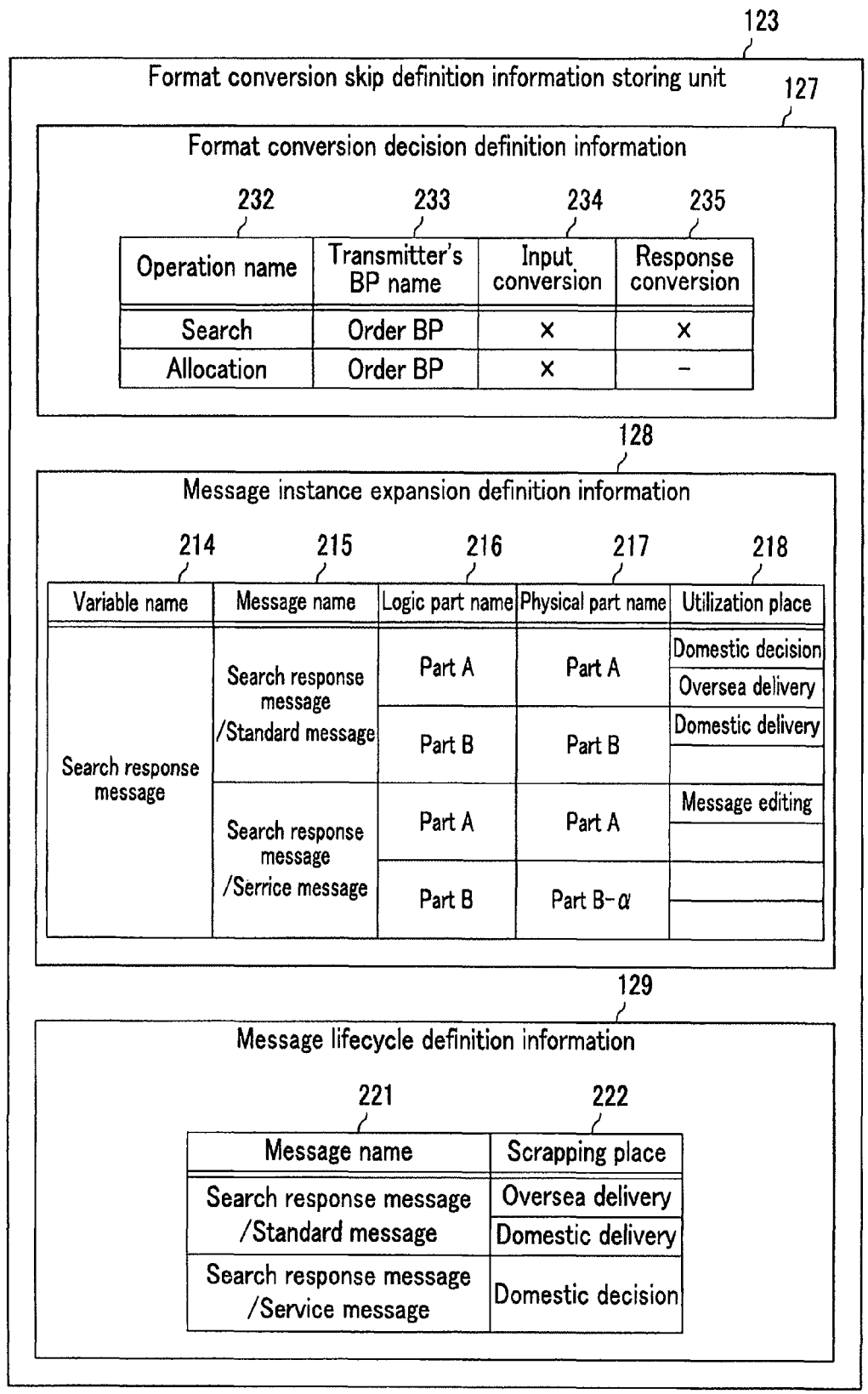
FIG. 9 is an illustration showing an example of format conversion skip definition information.

FIG. 9 is an illustration showing an example of a configuration of format conversion skip definition information. As shown in FIG. 9, the format conversion skip information is stored in the format conversion skip definition information storing unit 123 of the repository 121, and the information includes the format conversion decision definition information 127, the message instance expansion definition information 128, and the message lifecycle definition information 129.

The format conversion decision definition information 127 includes an operation name 232 of a service, a transmitter's business process name (BP name) 233 which transmits a message to the adapter operation control unit 133, an input conversion 234 which indicates whether or not a format conversion is necessary at a time of input of an operation, and a response conversion 235 which indicates whether or not a format conversion is necessary at a time of response to the operation.

Specific data of the format conversion decision definition information 127 are, for example, as follows in a case of the order business process 201 shown in FIG. 5. That is, when the operation name 232 is "search", since the format conversion is unnecessary at the times of input and response of the operation, data of the input conversion 234 and the response conversion 235 are both "×(conversion unnecessary)". In addition, when the operation name is "allocation", since the format conversion is unnecessary at the time of input of the operation and a response of the operation is not required, data of the input conversion 234 becomes "×(conversion unnecessary)", and data of the response conversion 235 becomes "–(response unnecessary)".

In addition, the message instance expansion definition information 128 includes a variable name 214 of a variable to be expanded, a message name 215 of a standard message format and service message format to be stored in the variable, a logic part name 216 of a sub-format which composes the standard message format set in the variable, a physical part name 217 of a sub-format of the standard message format and the service message format to be stored in the variable, and a utilization place 218 which indicates a name of activity which utilizes the standard message format and the service message format to be stored in the variable.

Here, the message name 215 of a standard message format and service message format and the logic part name 216 and physical part name 217 of the sub-formats have names which can be uniquely identified, respectively. In addition, here, a sub-format which composes a standard message format is called a logic part, and a sub-format, which is stored in a variable to be expanded, of a standard message format and service message format is called a physical part. At this time, a plurality of physical parts can be stored in a single logic part. For example, in the example in FIG. 9, a part B which is the physical part 217 composing the search response message (standard message) 252 and a part B-α which is the physical part 217 composing the search response message (service message) 255 can be stored in a part B of the logic part 216 corresponding to the search response message whose name is the variable name 214.

In addition, the message lifecycle definition information 129 includes a message name 221 of a message format to be stored in an expanded variable and a scrapping place 222 which indicates a name of an activity which finally utilizes the message format. In the example in FIG. 9, the search response message (standard message) 252 is scrapped in the activity of oversea delivery or domestic delivery, and the search response message (service message) 255 is scrapped in the activity of domestic decision.

<Processing Flow of Business Process in Service Operation Server 131>

Hereinafter, a processing flow of a business process in the service operation server 131 will be explained by taking the order business process 201 shown in FIG. 5 as an example, using FIG. 10. Here, it is noted that explanations of processing contents of the start activity 202 and end activity 209 of the order business process 201 will be omitted.

Figure 10:
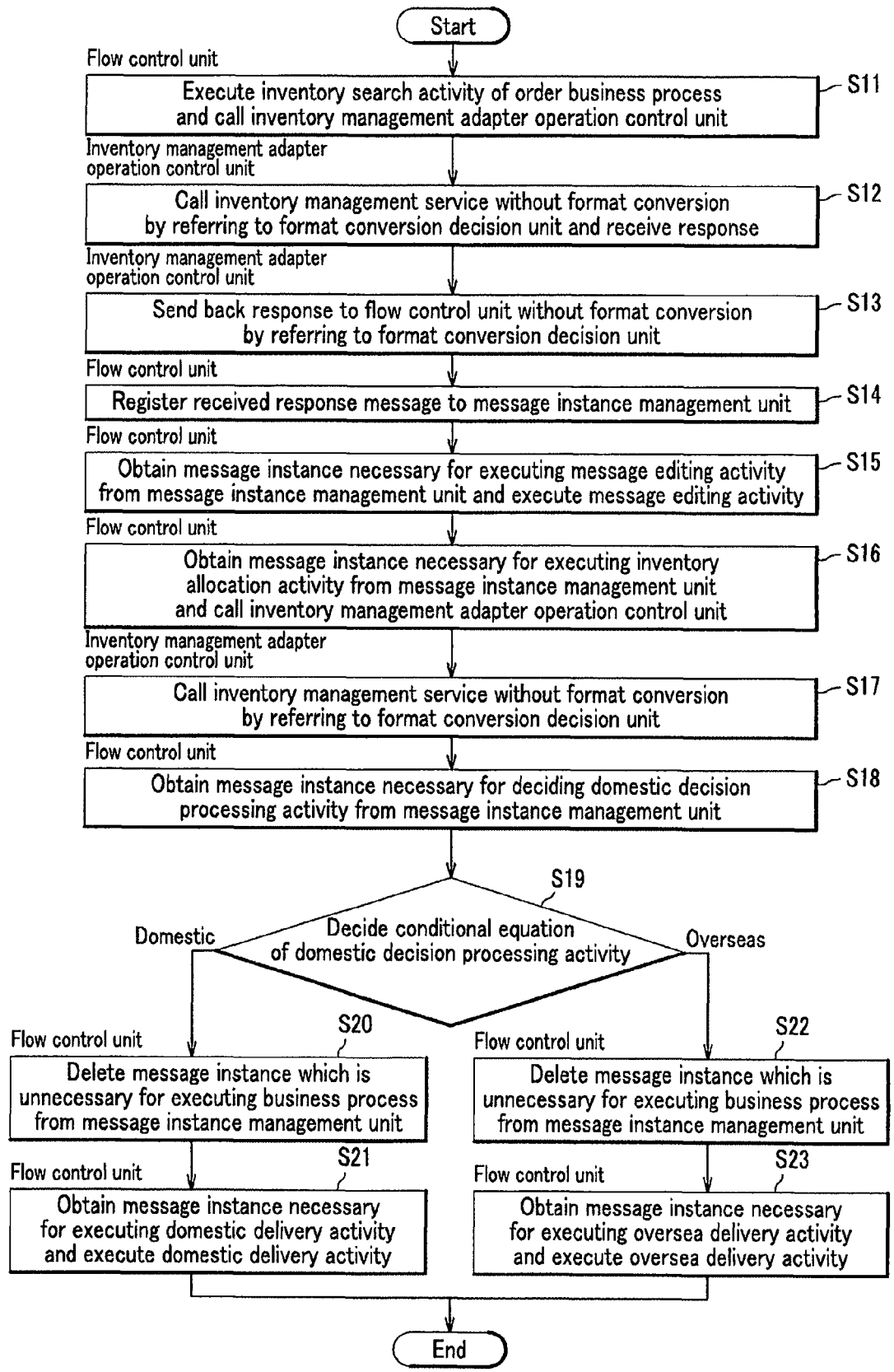
FIG. 10 is an illustration showing a summary of a processing flow of a business process in a service operation server.

FIG. 10 is an illustration showing a summary of a processing flow of a business process in the service operation server 131. It is noted that a processing for deleting a message instance which is unnecessary for executing a business process is the processing to be called every time when the flow control unit 144 executes an activity. However, in FIG. 10, only the processing which actually deletes a message instance which is unnecessary in the order business process 201 shown in FIG. 5 is described.

In FIG. 10, the flow control unit 144 first executes the inventory search activity 203 of the order business process 201, and calls the inventory management adapter operation control unit 231 (step S11). That is, the flow control unit 144 transmits the inventory search message (standard message) 251 to the inventory management adapter operation control unit 231 by referring to definition information of the inventory search activity 203.

Next, the inventory management adapter operation control unit 231 calls the inventory management service 271 without format conversion by referring to the format conversion decision unit 152, and receives a response from the inventory management service 271 (step S12). That is, when the inventory management adapter operation control unit 231 receives the inventory search message (standard message) 251 from the flow control unit 144, the inventory management adapter operation control unit 231 confirms an availability of a format conversion skip of the inventory search message (standard message) 251 at a time of input to the inventory management service 271 by referring to the format conversion decision table 1001. Then, based on the confirmation, the inventory management adapter operation control unit 231 transmits the inventory search message (standard message) 251 instead of the inventory search message (service message) 254 to the inventory management service 271 without format conversion, and calls a search operation of the inventory management service 271. The inventory management adapter operation control unit 231 receives the search response message (service message) 255 as a response of the calling.

Next, the inventory management adapter operation control unit 231 sends back a response to the flow control unit 144 by skipping format conversion by referring to the format conversion decision unit 152 (step S13). That is, the inventory management adapter operation control unit 231 confirms a format conversion skip availability of the received search response message (service message) 255 at the time of response by referring to the format conversion decision table 1001. Then, based on the confirmation, the inventory management adapter operation control unit 231 sends back the search response message (service message) 255 instead of the search response message (standard message) 252 to the flow control unit 144 without format conversion.

Next, the flow control unit 144 registers the received search response message (service message) 255 in the message instance management unit 141 by using the message registration unit 211 (step S14).

Next, the flow control unit 144 obtains a message instance (search response message (service message) 255) which is necessary for executing the message format editing activity 204 using the message acquisition unit 212, and executes the message format editing activity 204 (step S15). Then, the flow control unit 144 registers a newly generated inventory allocation message (service message) 256 in the message instance management unit 141, using the message registration unit 211.

Next, the flow control unit 144 obtains a message instance (inventory allocation message (service message) 256) which is necessary for executing the inventory allocation activity 205 from the message instance management unit 141 using the message acquisition unit 212, and calls the inventory management adapter operation control unit 231 (step S16). At this time, the flow control unit 144 transmits the inventory allocation message (service message) 256 instead of the inventory allocation message (standard message) 253 to the inventory management adapter operation control unit 231.

Next, the inventory management adapter operation control unit 231 calls the inventory management service 271 without format conversion by referring to the format conversion decision unit 152 (step S17). That is, when the inventory management adapter operation control unit 231 receives the inventory allocation message (service message) 256 from the flow control unit 144, the inventory management adapter operation control unit 231 confirms an availability of a format conversion skip of the inventory search message (standard message) 251 at a time of input to the inventory management service 271 by referring to the format conversion decision table 1001. Then, based on the confirmation, the inventory management adapter operation control unit 231 transmits the search allocation message (service message) 256 to the inventory management service 271 without format conversion, and calls an inventory allocation operation of the inventory management service 271.

In addition, the flow control unit 144 obtains a message instance which is necessary for deciding the domestic decision activity 206 from the message instance management unit 141 (step S18). That is, the flow control unit 144 requires the search response message (standard message) 252 which is necessary for deciding a conditional equation of the domestic decision activity 206 to the message acquisition unit 212. However, in the case of this example, since the message instance management unit 141 does not store the search response message (standard message) 252, the message instance management unit 141 generates the search response message (standard message) 252 by converting a format of the search response message (service message) 255, using the format conversion unit 142. Then, the message instance management unit 141 transmits the generated search response message (standard message) 252 to the flow control unit 144 and registers the message (standard message) 252 in the message instance management table 1002, using the message registration unit 211.

Next, the flow control unit 144 decides the conditional equation of the domestic decision activity 206 by utilizing the received search response message (standard message) 252 (step S19).

When a result of the decision is "domestic" (step S19: domestic), the flow control unit 144 transmits the activity name 243 in operation to the message lifecycle management unit 143, and deletes a message instance which is unnecessary for executing the order business process 201 from the message instance management unit 141 (step S20). Then, the flow control unit 144 obtains a message instance which is necessary for executing the domestic delivery activity 208, and executes the domestic delivery activity 208 (step S21).

On the other hand, when the result of the decision is "oversea" (step S19: oversea), the flow control unit 144 transmits the activity name 243 in operation to the message lifecycle management unit 143, and deletes a message instance which is unnecessary for executing the order business process 201 from the message instance management unit 141 (step S22). Then, the flow control unit 144 obtains a message instance which is necessary for executing the oversea delivery activity 207, using the message acquisition unit 212, and executes the oversea delivery activity 207 (step S23).

<Processing Details in Definition Server 101>

Figure 11:
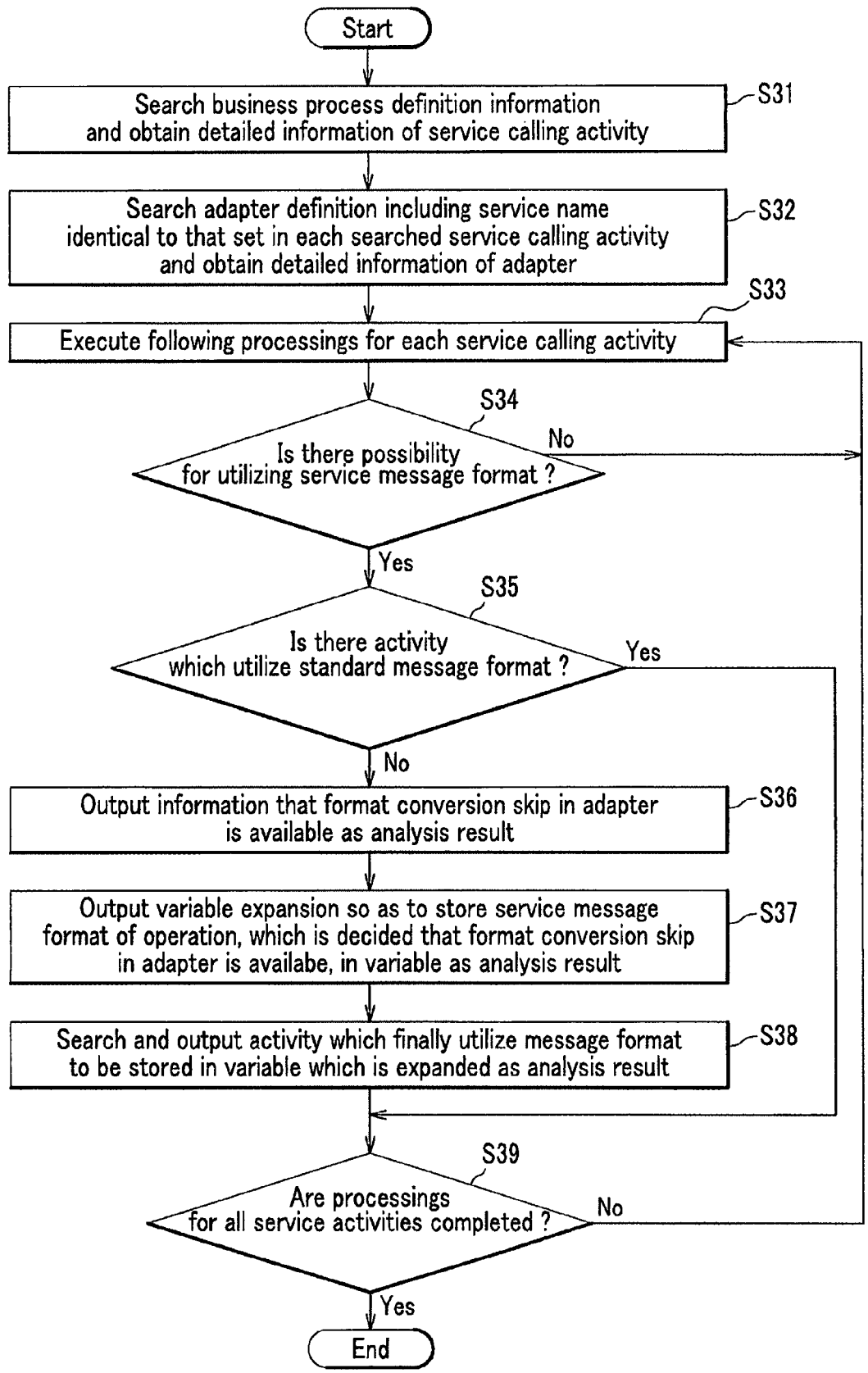
FIG. 11 is an illustration showing a processing flow of a definition analysis in detail in a definition server.

Next, a definition analysis processing in the definition server 101 will be explained in detail using FIG. 11. Here, FIG. 11 is an illustration showing a flow of the definition analysis processing in detail in the definition server 101. It is noted that the flow of the processing is a detailed processing in the step S04 in FIG. 7.

In FIG. 11, the definition analysis unit 107 searches the business process definition information 124 and obtains detailed information of a service calling activity (step S31). Here, the detailed information includes, for example, names of a service and operation to be connected, names of variables at times of input and response of the operation, and a message format which is defined in a variable. In addition, the search is sequentially executed for all activities from a start activity to end activity of a business process.

Next, the definition analysis unit 107 searches the adapter definition information 125 which includes a service name identical to that set in each service calling activity searched in the step S31, and obtains detailed information of the adapter (step S32). Here, the detailed information includes, for example, the names of the service and operation to be connected, a service message format, and a standard message format.

Next, the definition analysis unit 107 executes processings of the step S34 and later, which will be explained later, with respect to all service calling activities searched in the step S31.

Next, the definition analysis unit 107 searches, from information obtained in the steps S31 and S32, a possibility that a whole or part of the service message format at a time of response of the adapter, which is related to a target service calling activity, is utilized in a service called in the later business process. It is noted that the search is implemented sequentially for all service calling activities from the target service calling activity to end activity. As a result of the search, when there is a service which utilizes the service message format at the time of response (step S34: Yes), the definition analysis unit 107 executes a processing of step S35. On the other hand, when there is no service which utilizes the service message format (step S34: No), the definition analysis unit 107 returns to the step S33 and continues a processing of the next service calling activity. In addition, when a service which has no service message format at a time when an adapter response is called, that is, for example, when an asynchronous service which has no response is called, the definition analysis unit 107 returns to the step S33 and continues a processing of the next service calling activity.

Next, the definition analysis unit 107 searches whether or not there is an activity which utilizes a whole part or a part of the standard message format corresponding to the service message format before executing a service calling activity which calls a service utilizing the service message format in the step S34. It is noted that the search is implemented sequentially for all activities from a target service calling activity to all service calling activities which calls a service utilizing the service message format. Then, as a result of the search, when there is no activity which utilizes a whole or part of the standard message format between the target service calling activity and at least one service calling activity (step S35: No), the definition analysis unit 107 executes a processing of step S36. On the other hand, when there is an activity which utilizes a whole part or a part of the standard message format (step S35: Yes), the definition analysis unit 107 executes a processing of step S39.

Next, the definition analysis unit 107 outputs an availability of the format conversion skip as an analysis result at the time of response of the adapter relating to the target service calling activity and at the time of input of the adapter relating to the first service calling activity which calls a service utilizing the service message format in the step S35 (step S36).

Here, as the analysis result, the definition analysis unit 107 outputs a business process name, an operation name which is called by a service calling activity, and an existence or non-existence of a format conversion at the times of input and response of the operation. In addition, when there is no description in the analysis result about the existence or non-existence of the format conversion at the time of input of the adapter relating to the target service calling activity, the definition analysis unit 107 compares a service message format at the time of input of the adapter with the standard message format, and outputs a notification of no format conversion required when the both formats are identical and a notification of format conversion required when the two formats are different, as the analysis result.

Next, the definition analysis unit 107 outputs a variable expansion for storing the service message format of the operation, which is decided in the step S36 that the format conversion of the operation can be skipped, in a variable set in the service calling activity, as the analysis result (step S37). In addition, the definition analysis unit 107 searches an activity which edits a whole part or a part of a message format of the variable to be expanded at the time, and outputs the analysis result for expanding the variable set in the activity.

It is noted that there is a format conversion processing activity as an activity for editing a message format. In addition, as the analysis result, the definition analysis unit 107 outputs, for example, a variable name, a name of a standard message format defined in a variable, a name of a service message format defined in an adapter, a name of a sub-format of the standard message format defined in the variable, names of sub-formats of the standard message format and the service message format to be stored in the variable, and names of activities which utilize the standard message format and service message format.

Next, the definition analysis unit 107 searches an activity which finally utilizes a message format which is stored in the variable to be expanded, and outputs the activity as the analysis result (step S38). That is, the definition analysis unit 107 searches a name of a business process activity which finally utilizes the message format from the business process definition information 124 and the adapter definition information 125 corresponding to the service calling activity, with respect to the message format which is stored in the variable to be expanded in the step S37 and the message format which is stored in the variable which is defined in the business process definition information 124 and not expanded, and outputs the analysis result. The search is sequentially implemented for all activities from a start activity to end activity of the business process. It is noted the definition analysis unit 107 outputs, for example, a name of the message format which is stored in the variable to be expanded and a name of the activity which finally utilizes the message format, as the analysis result.

Next, the definition analysis unit 107 decides whether or not processings from the steps S34 to S36 are completed for all service calling activities which are searched in the step S31 (step S39). As a result of the decision, when the processings for the all service calling activities are completed (step S39: Yes), the definition analysis processing in FIG. 11 ends. On the other hand, when the processings for the all service calling activities are not completed (step S39: No), the step returns to the step S33 and continues a processing for the next service calling activity.

<Processing Details in Service Operation Server 131>

Hereinafter, a processing, which is specific to the present invention, of the service operation server 131 will be explained in detail by referring to FIG. 12 to FIG. 14.

Figure 12:
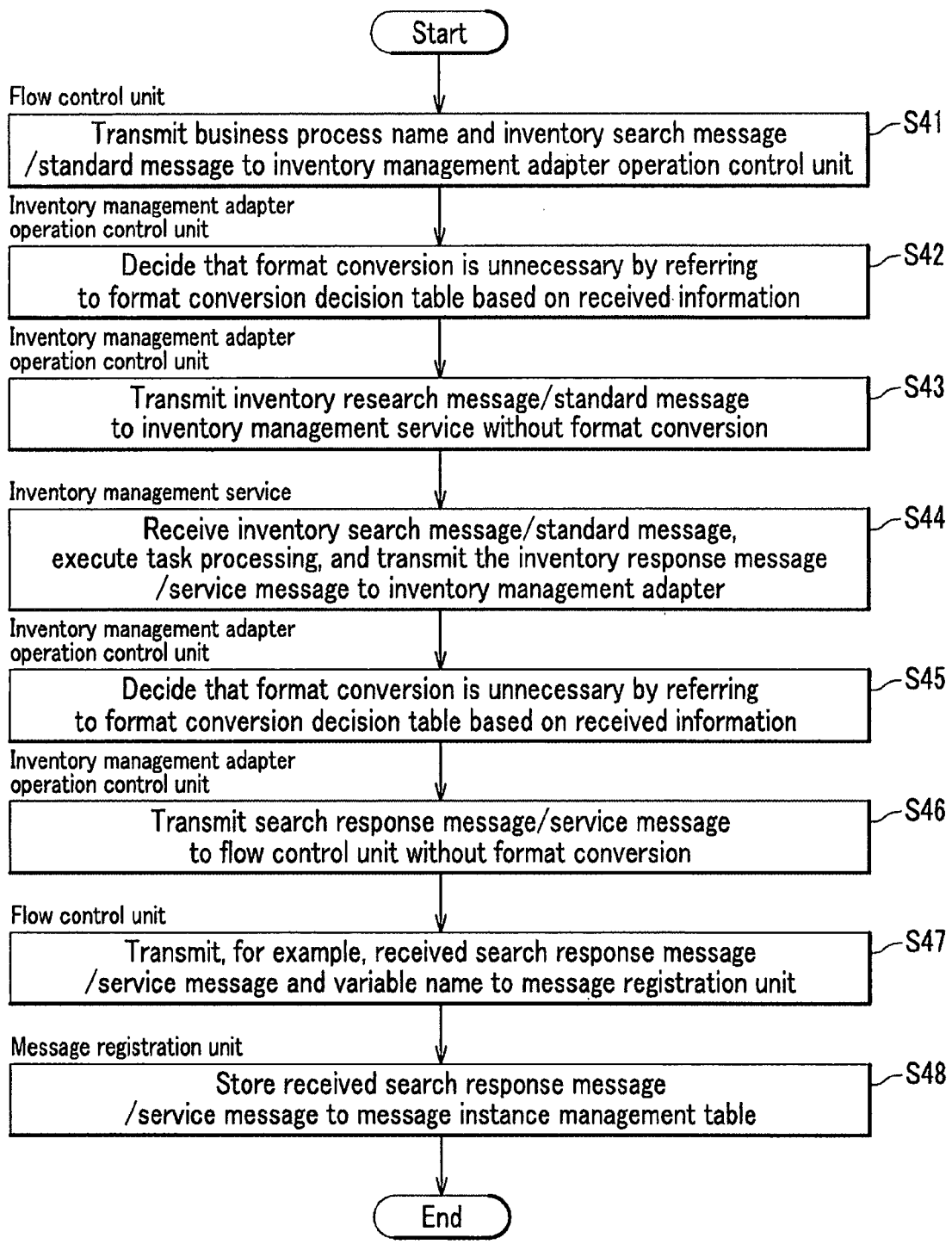
FIG. 12 is an illustration showing an example of a processing flow in detail for explaining a business process operation processing which skips a format conversion in a service operation server.

FIG. 12 is an illustration showing an example of a detailed processing flow for explaining operation processing of a business process in which a format conversion in the service operation server 131 is skipped. It is noted that processings which will be explained here correspond to those from the steps S11 to S14 in FIG. 10. That is, they correspond to the processings between a processing where the flow control unit 144 calls a search operation of the inventory management service 271 through the inventory management adapter operation control unit 231 from the inventory search activity 203 of the order business process 201 and a processing where the flow control unit 144 registers the received search response message (service message) 255 in the message instance management table 1002.

In FIG. 12, the flow control unit 144 first refers to a definition of the inventory search activity 203, and transmits a business process name 244 and the inventory search message (standard message) 251 to the inventory management adapter operation control unit 231 (step S41).

Next, the inventory management adapter operation control unit 231 refers to the format conversion decision table 1001 using the received business process name 244 and search operation name, and decides that the format conversion of the inventory search message (standard message) 251 is unnecessary (step S42). Here, the operation name may be included in a message instance to be transmitted from the flow control unit 144 to the adapter operation control unit 133, or the adapter operation control unit 133 which receives the message instance may evaluate the operation name by comparing the name with a message format which is set in the adapter definition information 125. In the embodiment, the operation name is included in the message instance.

Next, the inventory management adapter operation control unit 231 transmits the inventory search message (standard message) 251 to the inventory management service 271 without format conversion as the inventory search message (service message) 254 (step S43).

Next, the inventory management service 271 receives the inventory search message (standard message) 251, executes a predetermined task processing, and transmits the search response message (service message) 255 to the inventory management adapter operation control unit 231 (step S44).

Next, the inventory management adapter operation control unit 231 receives the search response message (service message) 255 and decides that the format conversion of the search response message (service message) 255 is unnecessary, by referring to the format conversion decision table 1001 using the business process name 244 included in the received information and search operation name (step S45).

Then, based on the decision, the inventory management adapter operation control unit 231 transmits the search response message (service message) 255 to the flow control unit 144 without format conversion as the search response message (standard message) 252 (step S46).

Next, the flow control unit 144 transmits the received search response message (service message) 255, a variable name 241 at the time of reception which is set in the inventory search activity 203, and a message format name 242 of the search response message (service message) 255 set in the variable to the message registration unit 211 (step S47).

Next, the message registration unit 211 stores the received search response message (service message) 255 in the message instance management table 1002 (step S48). That is, the message registration unit 211 searches and identifies a region in the message instance management table 1002 which includes identical information to the received variable name 241 and the message format name 242 of the search response message (service message) 255, and stores the received search response message (service message) 255 in the identified region. In the search, the received variable name 241 and message format name 242 are compared with the variable name 214 and message format name 215 of the message instance management table 1002.

Figure 13:
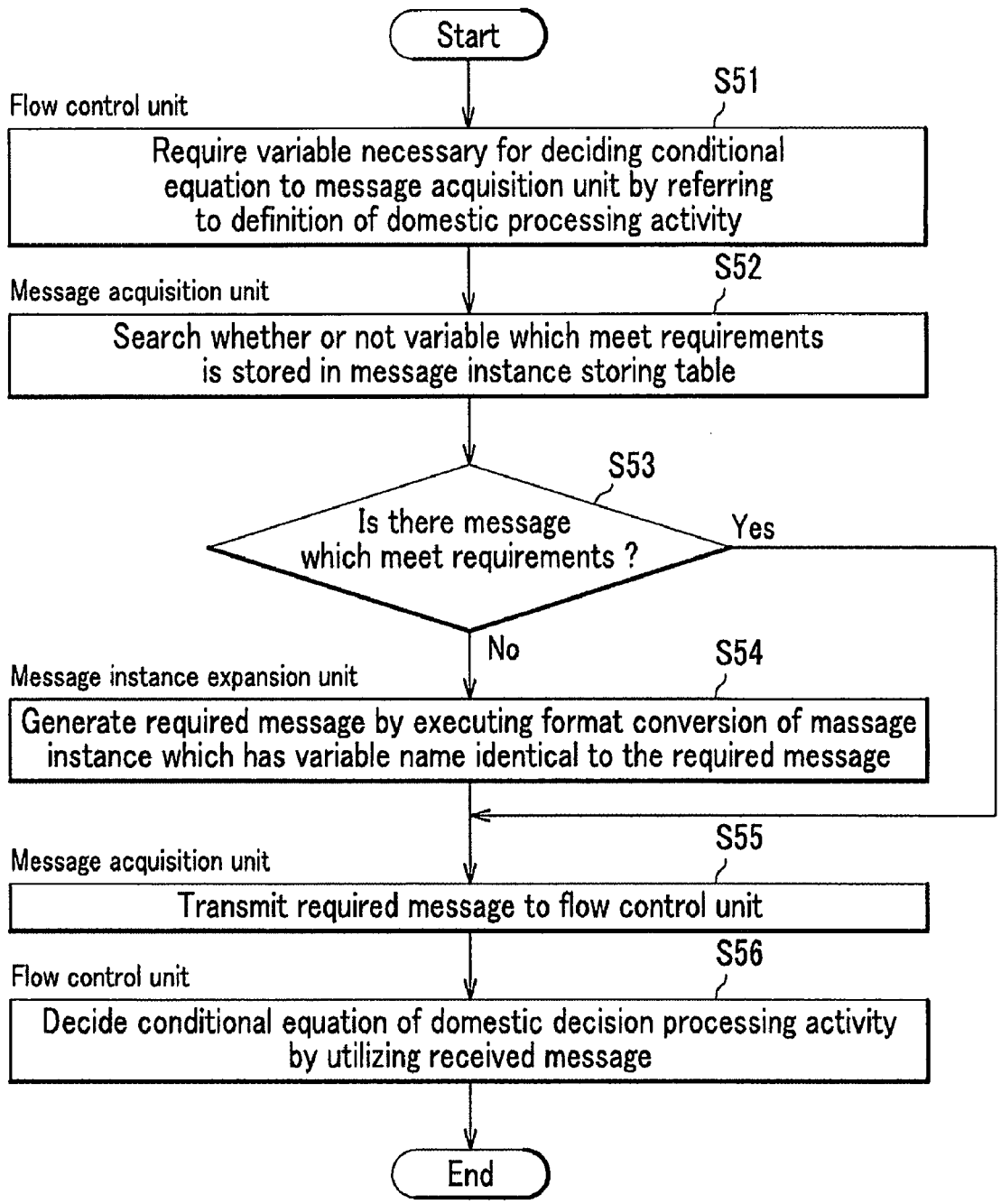
FIG. 13 is an illustration showing a processing flow in detail in a case when a standard message instance which is generated according to a standard message format is required in business process operation in a service operation server.

FIG. 13 is an illustration showing a detailed processing flow in a case when a standard message instance which is generated according to a standard message format is required in business process operation in the service operation server 131. Here, the processing flow in FIG. 13 will be explained in accordance with a processing flow of the domestic decision activity 206 of the order business process 201 shown in FIG. 5. It is noted that the processings in FIG. 13 correspond to the steps S18 and S19 in FIG. 10.

In FIG. 13, the flow control unit 144 first refers to a definition of the domestic decision activity 206, and requires a variable which is necessary for deciding a conditional equation to the message acquisition unit 212 (step S51). That is, the flow control unit 144 identifies the variable necessary for deciding the conditional equation from the definition of the domestic decision activity 206, and transmits the variable name 241 and the activity name 243 in operation to the message acquisition unit 212. At this time, when a plurality of variables are required for deciding the conditional equation, a plurality of variable names 241 and a plurality of activity names 243 which correspond to the plurality of variables are transmitted to the message acquisition unit 212, and processings from steps S52 to S55, which will be explained later, are repeated.

Next, the message acquisition unit 212 searches whether or not a variable which meets requirements from the flow control unit 144 is stored in the message instance management table 1002 (step S52). That is, the message acquisition unit 212 compares the received variable name 241 and activity name 243 with the variable name 214 and utilization place 218 in the message instance management table 1002 by referring to the message instance management table 1002.

Next, as a result of the search in the step S52, when the variable (message instance) which meets the requirements is stored in the message instance management table 1002 (step S53: Yes), the step proceeds to step S55. On the other hand, when the variable is not stored in the message instance management table 1002 (step S53: No), the step proceeds to step S54.

Next, the message instance expansion unit 161 executes the format conversion of a message instance which has an identical variable name to the message required by the flow control unit 144, and generates the required message (step S54). That is, the message instance expansion unit 161 obtains the search response message (service message) 255 which has an identical name to the variable name 241 received in the step S52 by referring to the message instance management table 1002, and executes the format conversion of the search response message (service message) 255 by utilizing the format conversion unit 142 to generate the search response message (standard message) 252. Then, the message instance expansion unit 161 stores the generated search response message (standard message) 252 in the message instance management table 1002, using the message registration unit 211.

Next, the message acquisition unit 212 transmits the required message, that is, the inventory search response message (standard message) 252 which is stored in the required variable, to the flow control unit 144 (step S55).

Next, the flow control unit 144 decides the conditional equation of the domestic decision activity 206 by utilizing the received search response message (standard message) 252 (step S56).

Figure 14:
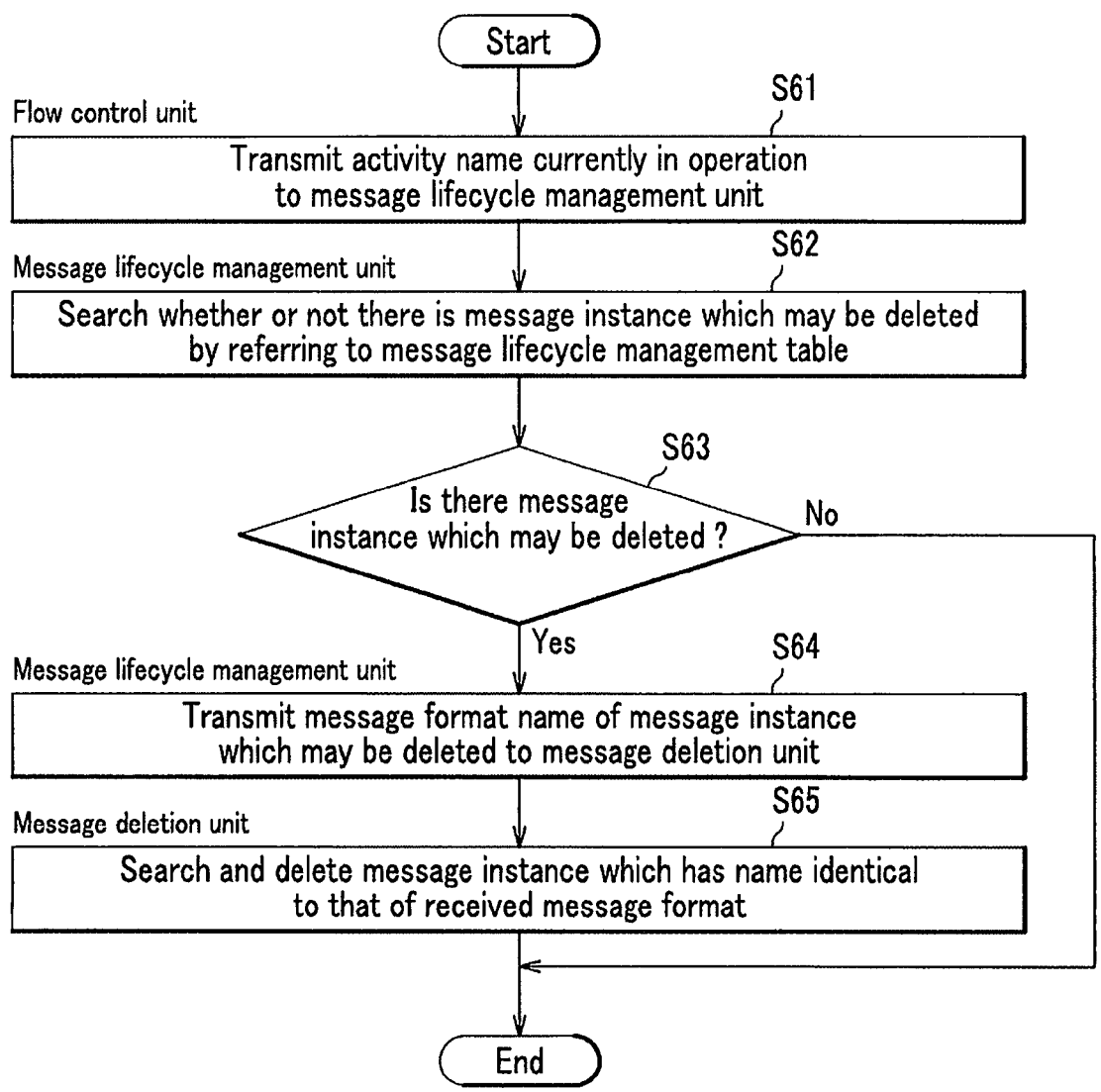
FIG. 14 is an illustration showing a processing flow in detail in a case when a message instance which is unnecessary to a business process operation is deleted in a service operation server.

FIG. 14 is an illustration showing a processing flow in detail in a case when a message instance which is unnecessary for executing a business process is deleted in the service operation server 131. Here, the processing flow in FIG. 14 will be explained in accordance with a processing flow of the domestic decision activity 206 of the order business process 201 shown in FIG. 5. It is noted that the processings in FIG. 14 correspond to those in the step S20 or S22 in FIG. 10.

In FIG. 14, the flow control unit 144 transmits the activity name 243 currently in operation to the message lifecycle management unit 143 (step S61).

Next, the message lifecycle management unit 143 checks whether or not there is a message instance which may be deleted by referring to the message lifecycle management table 1003 (step S62). In the search, the received activity name 243 is compared with the scrapping place 222 in the message lifecycle management table 1003.

Next, the message lifecycle management unit 143 decides whether or not there is a message instance which may be deleted in the message lifecycle management table 1003. When there is no message instance which may be deleted, the processing in FIG. 14 ends. On the other hand, when there is a message instance which may be deleted, processings of steps S64 and S65, which will be explained next, are repeated as many times as the number of the message instances which may be deleted.

Next, the message lifecycle management unit 143 transmits the message format name 242 of the message instance which may be deleted from the message lifecycle management table 1003 to the message deletion unit 213 (step S64).

Next, the message deletion unit 213 searches a message instance which has a name identical to the received message format name 242 by referring to the message instance management table 1002, and deletes the corresponding message instance (step S65). In the search, the received message format name 242 is compared with the message format name 215 in the message instance management table 1002.

With the processings described above, when a message format at the time of response of a service which is called from a business process can be utilized as a message format at the time of input of a service which is called in the later business process, the business process can be executed without format conversion in the adapter. In addition, a message which is unnecessary for executing the business process can be deleted.

The invention claimed is:

1. A business process operation method implemented by at least one computer, which comprises an adapter, a service achieved by a business process, and the business process composed of a plurality of activities, the activities executed by the computer and the adapter executing a conversion between a message format used by an activity of the business process and a message format used by a service whose execution is instructed by the activity if the message format used by the activity of the business process and the message format used by the service are different, the method comprising steps of:

referring in the at least one computer to business process definition information and adapter definition information which are stored in advance in a storage;

comparing in the at least one computer the message format used by the activity of the business process, which instructs execution of the service with the message format used by the service;

generating in the at least one computer information indicating a format conversion is unnecessary for the activity of the business process on condition that at least a part of a response message format, which is a response of the service, is utilized by a service whose execution is instructed by another activity to be executed and that the message format used by the activity of the business process corresponding to the response message format is not utilized by an activity preceding the another activity, if the message format used by the activity of the business process and the message format used by the service are different;

storing the information in the storage as format conversion decision definition information;

the adapter referring to the format conversion decision definition information for the activity stored in the storage when the activity of the business process instructs execution of the service; and the adapter skipping the format conversion between the message instance used by the activity of the business process and the message instance used by the service when the format conversion decision definition information indicates that the format conversion is unnecessary.

2. The business process operation method according to claim 1, further comprising a step of:

storing a message instance used by the service, which is a response to the activity, in the storage when the format conversion is skipped.

3. The business process operation method according to claim 2, further comprising steps of:

searching an activity in which a format of the response message is not to be used in the business process by referring to the business process definition information and adapter definition information;

generating information in which the activity is associated with the response message;

storing the information in the storage as message lifecycle definition information; and deleting a message instance of the response message from the storage when the service by the activity of the business process is executed if the message instance, which is associated with the activity by the message lifecycle definition information, is stored in the storage.

4. The business process operation method according to claim 2, further comprising steps of:

executing the format conversion of the message instance of the message used by the service stored in the storage if there is not a message instance necessary for instructing execution of the service by the activity according to the business process; and generating the message instance necessary for instructing execution of the service by the activity.

5. A business process operation system comprising at least one computer, which executes activities constituting a business process for achieving a service, the computer of the system comprising:

a format conversion decision definition generating unit, which refers to business process definition information and adapter definition information which are stored in advance in a storage, compares the message format used by the activity of the business process, which instructs execution of the service with the message format used by the service, generates information indicating a format conversion is unnecessary for the activity of the business process on condition that at least a part of a response message format, which is a response of the service, is utilized by a service whose execution is instructed by another activity to be executed and that the message format used by the activity of the business process corresponding to the response message format is not utilized by an activity preceding the another activity, if the message format used by the activity of the business process and the message format used by the service are different, and stores the information in the storage as format conversion decision definition information; and an adapter for executing a conversion between a message format used by an activity of the business process and a message format used by a service whose execution is instructed by the activity if the message format used by the activity of the business process and the message format used by the service are different, while the adapter refers to the format conversion decision definition information for the activity stored in the storage when the activity of the business process instructs execution of the service, and skips the format conversion between the message instance used by the activity of the business process and the message instance used by the service when the format conversion decision definition information indicates that the format conversion is unnecessary.

6. The computer of the system according to claim 5, further comprising:

a message instance management unit which stores a message instance used by the service, which is a response to the activity, in the storage when the adapter skips the format conversion.

7. The computer of the system according to claim 6, further comprising:

a message lifecycle definition generating unit, which searches an activity in which a format of the response message is not to be used in the business process by referring to the business process definition information and adapter definition information, generates information in which the activity is associated with the response message, and stores the information in the storage as message lifecycle definition information; and a message lifecycle management unit, which deletes a message instance of the response message from the storage when the service by the activity of the business process is executed if the message instance which is associated with the activity by the message lifecycle definition information is stored in the storage.

8. The computer of the system according to claim 6, further comprising:

a format conversion unit, which executes the format conversion of the message instance of the message used by service stored in the storage if there is not a message instance necessary for instructing execution of the service by the activity according to the business process, and generates the message instance necessary for instructing execution of the service by the activity.

9. A program for operating a business process by at least one computer, which comprises an adapter, a service achieved by a business process, and the business process composed of a plurality of activities, the activities executed by the computer and the adapter executing a conversion between a message format used by an activity of the business process and a message format used by a service whose execution is instructed by the activity if the message format used by the activity of the business process and the message format used by the service are different, the program comprising:
- a first processing having the computer refer to business process definition information and adapter definition information which are stored in advance in a storage, compare the message format used by the activity of the business process, which instructs execution of the service with the message format used by the service, generate information indicating a format conversion is unnecessary for the activity of the business process on condition that at least a part of a response message, which is a response of the service, is utilized by a service whose execution is instructed by another activity to be executed and that the message format used by the activity of the business process corresponding to the response message format is not utilized by an activity preceding the another activity, if the message format used by the activity of the business process and the message format used by the service are different, and store the information in the storage as format conversion decision definition information; and
- a second processing having the adapter refer to the format conversion decision definition information for the activity stored in the storage when the activity of the business process instructs execution of the service, and skip the format conversion between the message instance used by the activity of the business process and the message instance used by the service when the format conversion decision definition information indicates that the format conversion is unnecessary

10. The program according to claim 9, further comprising:
- a third processing having the computer store a message instance used by the service, which is a response to the activity, in the storage when the format conversion is skipped.

11. The program according to claim 10, further comprising:
- a fourth processing having the computer search an activity in which a format of the response message is not to be used in the business process by referring to the business process definition information and adapter definition information, generate information in which the activity is associated with the response message, and store the information in the storage as message lifecycle definition information; and
- a fifth processing having the computer delete a message instance of the response message from the storage when the service by the activity of the business process is executed if the message instance which is associated with the activity by the message lifecycle definition information is stored in the storage.

12. The program according to claim 10, further comprising:
- a sixth processing having the computer execute the format conversion of the message instance of the message used by the service stored in the storage if there is not a message instance necessary for instructing execution of the service by the activity according to the business process, and generate the message instance necessary for instructing execution of the service by the activity.

* * * * *